United States Patent
Bailey et al.

(10) Patent No.: US 10,503,576 B2
(45) Date of Patent: Dec. 10, 2019

(54) MAINTAINING CORE DUMP PRIVACY DURING APPLICATION FAULT HANDLING

(71) Applicant: INTERNATIONAL BUSINESS MACHINES CORPORATION, Armonk, NY (US)

(72) Inventors: Christopher N. Bailey, Hursley (GB); Paul K. Bullis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 15/047,693

(22) Filed: Feb. 19, 2016

(65) Prior Publication Data

US 2017/0243019 A1    Aug. 24, 2017

(51) Int. Cl.
G06F 11/07    (2006.01)
G06F 21/62    (2013.01)
G06F 11/36    (2006.01)

(52) U.S. Cl.
CPC ...... *G06F 11/0778* (2013.01); *G06F 11/0703* (2013.01); *G06F 11/079* (2013.01); *G06F 21/6218* (2013.01); *G06F 21/6245* (2013.01); *G06F 11/366* (2013.01)

(58) Field of Classification Search
CPC .............. G06F 21/6218; G06F 11/079; G06F 11/0778; G06F 11/0703; G06F 21/6245; G06F 11/366
See application file for complete search history.

(56) References Cited

U.S. PATENT DOCUMENTS

| | | | |
|---|---|---|---|
| 7,484,060 B2 | 1/2009 | Kelly et al. | |
| 7,913,115 B1* | 3/2011 | Powers | G06F 11/0748 714/18 |
| 8,190,914 B2 | 5/2012 | van Riel et al. | |
| 8,645,793 B2 | 2/2014 | Szegedi et al. | |
| 8,930,327 B2 | 1/2015 | Hossain et al. | |
| 9,639,412 B1* | 5/2017 | Levy | H04L 43/065 |
| 2004/0060049 A1* | 3/2004 | Mendoza | G06F 9/485 718/100 |
| 2004/0139317 A1* | 7/2004 | Fronberg | G06F 21/6281 713/164 |
| 2005/0144412 A1* | 6/2005 | Swafford | G06F 11/366 711/170 |

(Continued)

OTHER PUBLICATIONS

Viega, John, "Protecting Sensitive Data in Memory," developerWorks, downloaded from internet Oct. 6, 2015, pp. 1-6.

(Continued)

*Primary Examiner* — Cheng-Feng Huang
(74) *Attorney, Agent, or Firm* — Heslin Rothenberg Farley & Mesiti P.C.; Robert Shatto, Esq.

(57) ABSTRACT

Maintaining core dump privacy during application fault handling. A core memory dump is received for an application from a runtime engine. Areas of the core memory dump are analyzed to identify structural data in the form of internal structures of the runtime engine. The identified structural data is retained in a modified core memory dump, and remaining non-structural data in the areas of the core memory dump is processed to ensure it is not readable by unauthorized entities in the modified core memory dump. The modified core memory dump is outputted for fault analysis.

17 Claims, 4 Drawing Sheets

(56) References Cited

U.S. PATENT DOCUMENTS

| | | | |
|---|---|---|---|
| 2006/0074714 A1* | 4/2006 | Aziz | G06Q 10/06 |
| | | | 705/2 |
| 2007/0208954 A1* | 9/2007 | Van Riel | G06F 12/08 |
| | | | 713/193 |
| 2008/0126301 A1* | 5/2008 | Bank | G06F 11/366 |
| 2009/0172409 A1* | 7/2009 | Bullis | G06F 21/50 |
| | | | 713/189 |
| 2014/0258990 A1* | 9/2014 | Klic | G06F 11/3636 |
| | | | 717/128 |
| 2015/0248564 A1 | 9/2015 | Feng et al. | |

OTHER PUBLICATIONS

Broadwell, Pete, "SCRASH: A System for Generating Secure Crash Information," Proceedings of the 12$^{th}$ Conference on USENIX Security Symposium, vol. 12, Aug. 2003, pp. 273-284 (+ cover page).

\* cited by examiner

MAINTAINING CORE DUMP PRIVACY DURING APPLICATION FAULT HANDLING

BACKGROUND

One or more aspects of the present invention relate to application fault handling and, more specifically, to maintaining core dump privacy during application fault handling.

When a software application has a failure, memory dump files are commonly created in order to provide first failure diagnostic data capture for fault handling. The memory dump may then be used with powerful tooling to provide vital capabilities for investigating, analyzing and resolving the failure. This is possible because the memory dump contains the complete state of the software application at the point of failure, including all of the data that the application is acting on.

These dumps are therefore commonly transferred to systems administrators and developers for analysis. The dumps may also be required to be sent to software vendors in order to investigate the cause of any failure.

This however provides an exposure of potentially confidential data in the memory dump. Even data that is stored in an encrypted format may exist in a non-encrypted form in the memory dump as the software application has to decrypt the data in order to act upon it.

As a result there is a need to ensure that potentially confidential information can be removed from a memory dump, while retaining the ability to use the memory dump to diagnose the cause of software failures.

SUMMARY

Shortcomings of the prior art are overcome and additional advantages are provided through the provision of a computer-implemented method of maintaining core dump privacy during application fault handling. The computer-implemented method includes receiving a core memory dump for an application from a runtime engine; analyzing areas of the core memory dump to identify structural data in a form of internal structures of the runtime engine; retaining the identified structural data in a modified core memory dump; processing remaining non-structural data in the areas of the core memory dump to ensure it is not readable by unauthorized entities in the modified core memory dump; and outputting the modified core memory dump for fault analysis.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
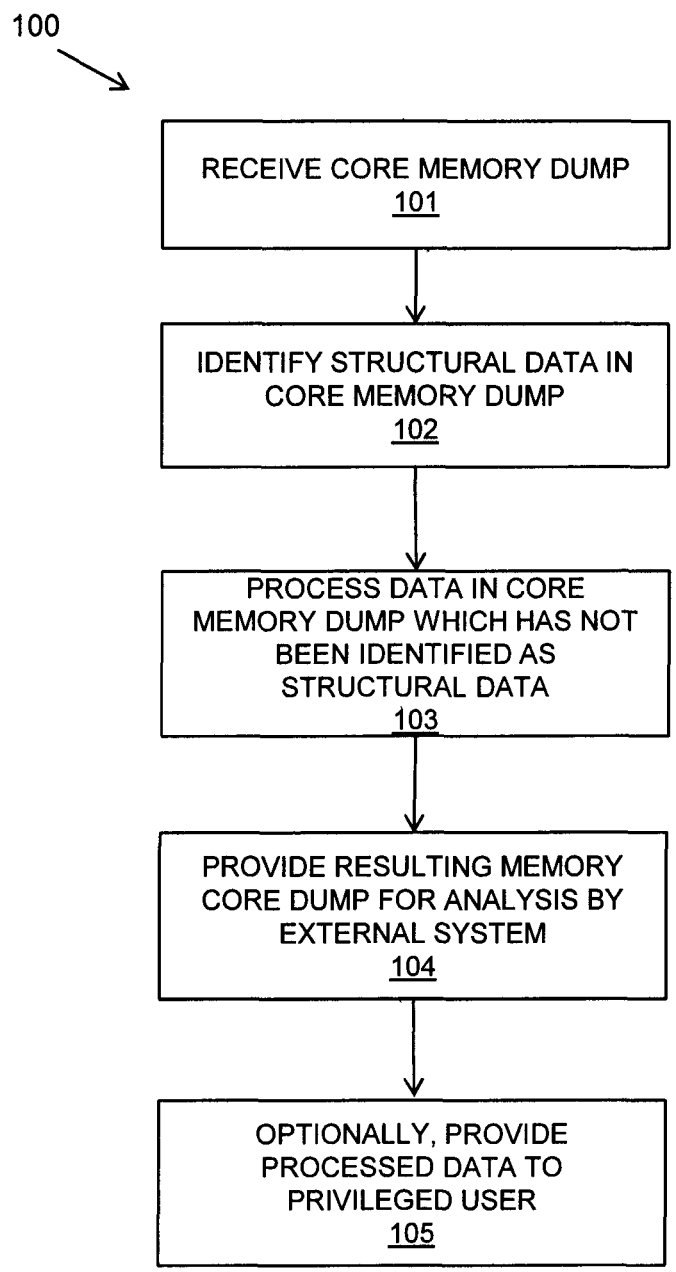
FIG. 1 is a flow diagram of an example embodiment of a method in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described aspects are provided for application failure analysis in an application running on a host computing platform. The host computing platform may include a virtual machine on which the application may run.

In the event of detecting an application fault requiring termination of execution of an application, an interrupt signal may be activated and a core dump may be generated of diagnostic artifacts of the application. Thereafter, the core dump may be passed to the operating system for analysis or to an external analysis system.

During core dump analysis of an application, structural data is to be analyzed; however, this is to be extracted without any runtime application data that may contain potentially confidential information.

Aspects are provided for maintaining core dump privacy during application failure. This is achieved by identifying and retaining structural data in the core dump, which includes the internal structures of the runtime but does not contain any application data. All of the remaining data, which may have been generated during the application execution, is processed to remove, obfuscate or encrypt it to ensure any potentially confidential information is either removed or hidden.

The structural data is retained in order to allow the memory dump to be analyzed by operating system platform debugger tools or by third party tools. This allows software vendors to diagnose any issue that might be caused by an error in the runtime itself.

Access to the non-structural data may be allowed by privileged users for analysis. Any analysis of errors caused by the application itself or user data can only be carried out by privileged users who have access to the original dump, or that are provided with the necessary credentials to de-obfuscate or decrypt the dump.

Potentially confidential information may be resident in various locations in a memory dump of an application's data. Examples of these locations are listed below.

Object heap—Potentially confidential data may exist within the object heap of an object orientated runtime (such as Java®, JavaScript or Ruby). Objects and the data stored within those objects may be identified. Java and all Java-based trademarks and logos are trademarks or registered trademarks of Oracle and/or its affiliates.

Thread stacks—The thread stacks for the threads executing the application code store local variables that are being used by the executing code. Values loaded from an object that are being used by local variables inside methods or functions may therefore contain the potentially confidential information.

Thread registers—For each thread, the values that are currently being acted upon are loaded into registers. If any thread is currently acting on potentially confidential information, then this is likely to be stored in a register.

I/O buffers—As data is being transferred in or out of the software application, data is copied between the object heap and I/O buffers used by the operating system. For example, this means that any data being sent to a database at the time of a failure is likely to be stored in the I/O buffers as well as the object heap.

The method may analyze an application's data in each of the above locations, namely: the object heap, thread stacks, thread registers and I/O buffers, to identify structural data in the form of the internal structures of the runtime engine. The remaining application data, excluding the identified structural data, may be removed or hidden. The application data may then be provided for analysis of the retrained structural data. A privileged user may be provided with access to the original dump, or may be provided with the necessary credentials to de-obfuscate or decrypt the dump for analysis of the runtime user data.

Core dumping of diagnostic artifacts is part of many computing environments, including virtualized computing environments, such as the Java computing environment. In the event of detecting an application fault requiring termination of execution of an application, the Java environment provides an interrupt signal to be intercepted by a virtual machine signal handler. Upon interception of the interrupt signal, the handler may generate a core dump, depending upon the configuration of the virtual machine. Thereafter, the core dump may be passed to the operating system for analysis or to an external analysis system. The core dump contents may be better described where a virtual machine is in use, so more structural information may be retained.

The described aspects apply to object oriented applications or processes and non-object oriented applications or processes. As above, it may be more efficient for object-oriented applications as the objects provide descriptions of the memory they are using.

Referring to FIG. 1, a flow diagram 100 shows an example embodiment of a method of maintaining core dump privacy during an application failure.

A core memory dump is received 101 by a privacy maintaining component. The privacy maintaining component may be provided as part of a virtual machine process running an application. The privacy maintaining component may be provided locally to the application or remotely with privacy controls between the application and the privacy maintaining component as the privacy maintaining component handles potentially confidential runtime application data. The core memory dump may include runtime data including the object heap, thread stacks, thread registers and I/O buffers.

Structural data is identified 102 in the core memory dump for retention in a modified core memory dump. A number of pre-existing technologies provide the ability to define the size, shape and relationship between runtime structures, and to subsequently use those definitions to identify and traverse the runtime structure information in a memory dump.

Such analysis tools may include the MDB modular debugger of Joyent, Inc. and the IBM® Interactive Diagnostic Data Explorer (IDDE). IBM is a trademark of International Business Machines Corporation, registered in many jurisdictions worldwide. MDB provides a tool for inspecting an application's state and showing all the state in the form of objects in an application. IDDE provides a visual representation of a set of dump files. These tools may be accessed remotely. These tools can be used to traverse the data in the memory dump to identify regions of the memory dump that are to be preserved.

Such analysis tools may work by having a description of what all of the data structures look like in memory. The tools begin by locating an identifier in memory (usually some type of flag or eye catcher value) that allows that memory to be mapped to a specific data structure. The relationships between data structures (most structures reference other structures) are then used to overlay a map of all of the data structures onto the memory.

Once it is identified which memory is structural, what is left over may be identified as non-structural data. Some of the non-structural data may be preserved because it is non-confidential (for example, it may be a simple flag, etc.) but all the rest may be removed or hidden.

All areas of memory that have not been identified for retention may subsequently be processed 103 by being removed, obfuscated, or encrypted such that the resulting core memory dump only contains readable structural information related to the operation of the runtime. Obfuscation replaces the memory with other values. When using obfuscation, care should be taken that the values do not point to other areas of memory in the dump that may be done by ensuring the values are outside the range of memory contained in the dump.

The resulting modified memory dump including retained structural data and, optionally, hidden data may be provided 104 for analysis by external systems and users.

A privileged user who meets confidentiality criteria may be provided 105 with access to the original memory dump, or may be provided with the necessary credentials to de-obfuscate or decrypt the modified memory dump.

The method uses of the ability of known technology to traverse and identify structural data, and uses this to determine areas of the dump that are shareable with non-privileged users, and processes the remaining data such that it may be shareable with privileged users.

Figure 2:
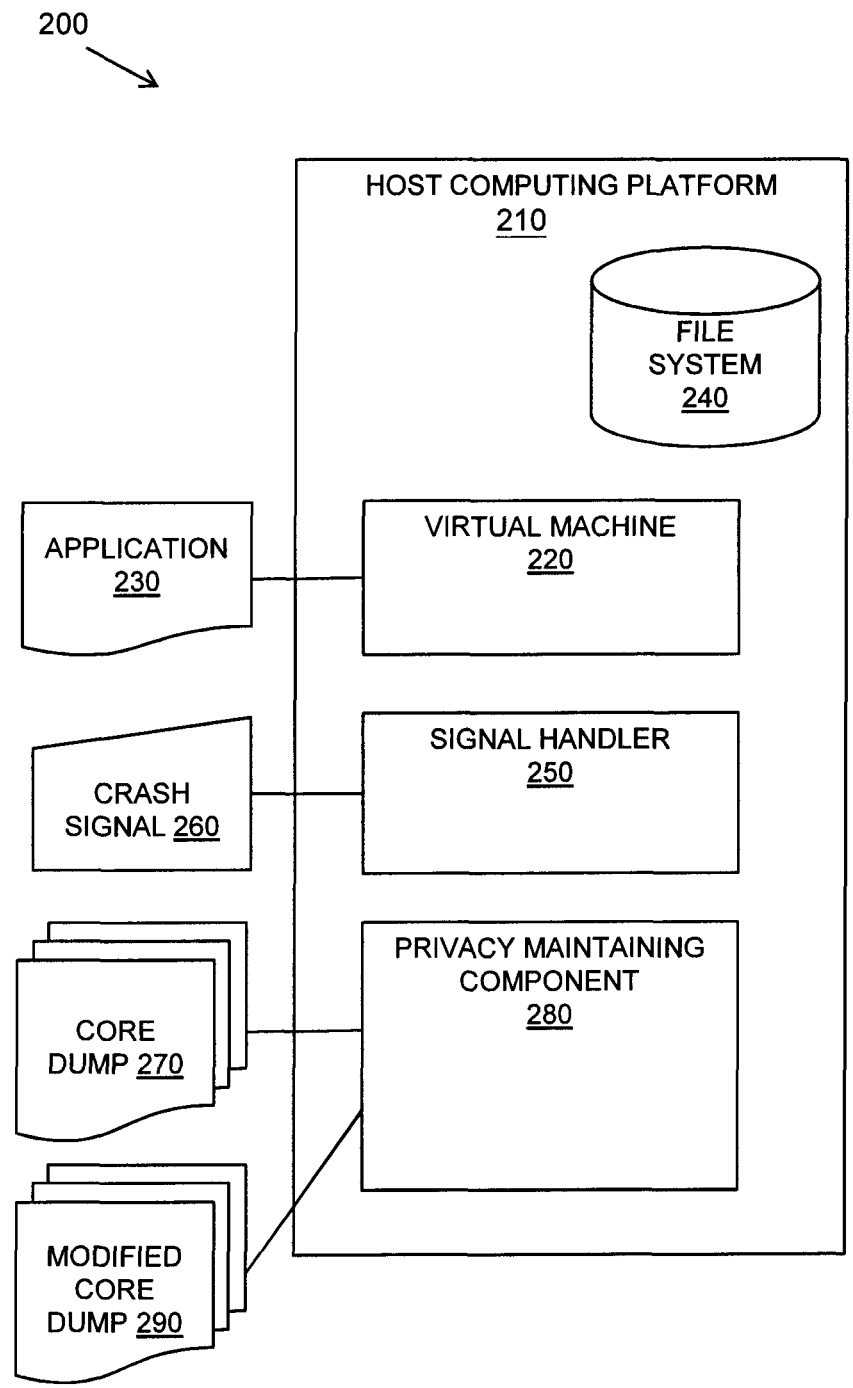
FIG. 2 is a block diagram of an embodiment of a computer system in which one or more aspects of the present invention may be implemented.

Referring to FIG. 2, a block diagram 200 shows an example system in which the described aspects may be implemented.

Figure 4:
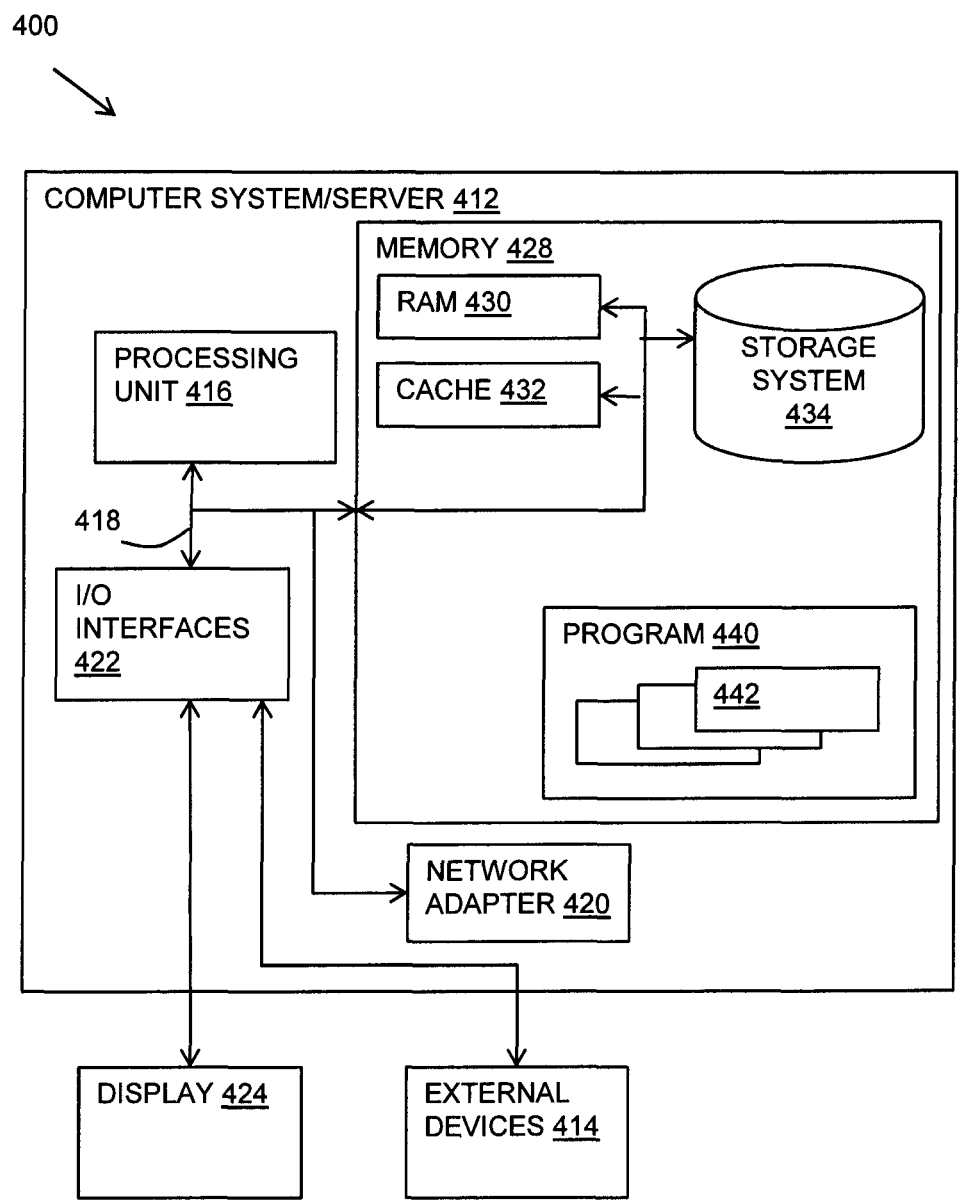
FIG. 4 is a block diagram of an embodiment of a computer system in which one or more aspects of the present invention may be implemented.

A host computing platform 210 is provided which may take the form of a computer system as described in FIG. 4. In this embodiment, the host computing platform 210 is provided on which a virtual machine process 220 may run providing an abstracted and platform-independent program execution environment which may manage the execution of an application 230. A file system 240 may be coupled to the host computing platform 210 into which data may be stored by the application 230.

A signal handler 250 may be coupled to the virtual machine process 220 or provided as part of the virtual machine process 220. The signal handler 250 may include a configuration to generate a core dump 270 responsive to the receipt of a crash signal 260 received from the virtual machine process 220 for the application 230.

A privacy maintaining component 280 may be provided and coupled to the signal handler 250 or included as part of the signal handler 250. The privacy maintaining component 280 may include program code described in further detail with regard to FIG. 3 for maintaining privacy of data in the application 230. The privacy maintaining component 280 may be enabled to create a modified core dump 290 which may be stored in the file system 240 or exported for remote analysis.

Figure 3:
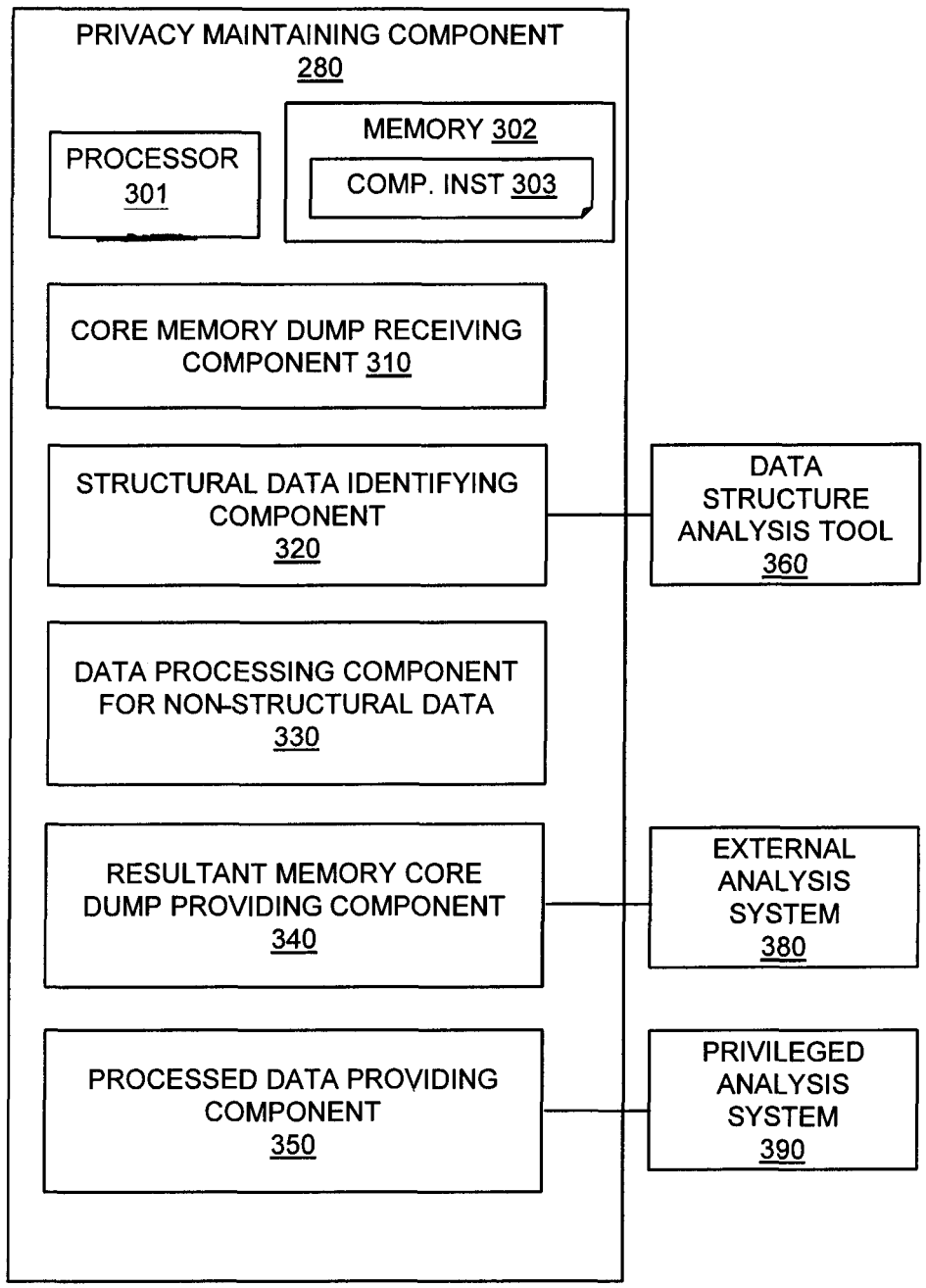
FIG. 3 is a block diagram of an example embodiment of a system in accordance with one or more aspects of the present invention.

Referring to FIG. 3, a block diagram 300 shows an example embodiment of a privacy maintaining component 280. The privacy maintaining component 280 may be provided as part of the signal handler 250 of a virtual machine process 220 or may be provided as a separate, possibly remotely provided component. If provided as a remotely provided component, appropriate security provisions should be provided to ensure the unprocessed core memory dump is kept secure and confidential.

The privacy maintaining component 280 may include or have access to at least one processor 301, a hardware module, or a circuit for executing the functions of the described components which may be software units executing on the at least one processor. Memory 302 may be configured to provide computer instructions 303 to the at least one processor 301 to carry out the functionality of the components.

The privacy maintaining component 280 may include a core memory dump receiving component 310 for receiving a core dump for an application which has encountered a failure.

The privacy maintaining component 280 may include a structural data identifying component 320 for identifying structural data in the received core memory dump for retention in a modified core dump. The structural data identifying component 320 may use a data structure analysis tool 360, such as MDB of Joyent, Inc. or DDE of International Business Machines Corporation. Such a tool may be accessed remotely or may be integral to the privacy maintaining component 280.

The privacy maintaining component 280 may include a data processing component 330 for the non-structural data to process the non-structural data to remove it or to obfuscate or encrypt it.

The privacy maintaining component 280 may include a resultant memory core dump providing component 340 for providing the modified memory core dump to an external analysis system 380. The modified memory core dump may include the retained structural data and, optionally, obfuscated or encrypted application data, and therefore, does not include any potentially confidential information.

The privacy maintaining component 280 may include a processed data providing component 350 which may be configured to provide the modified memory core dump to a privileged analysis system 390 which may have the capability to de-obfuscate or de-crypt the potentially confidential application data in the modified memory core dump for further analysis.

Referring now to FIG. 4, a schematic of an example of a host computing platform 400 in the form of a computer system or server 412 is shown.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

As described herein, according to an embodiment of the present invention, there is provided a computer-implemented method for maintaining core dump privacy during application fault handling, comprising: receiving a core memory dump for an application from a runtime engine; analyzing areas of the core memory dump to identify structural data in the form of internal structures of the runtime engine; retaining the identified structural data in a modified core memory dump; processing the remaining non-structural data in the areas of the core memory dump to ensure it is not readable by unauthorized entities in the modified core memory dump; and outputting the modified core memory dump for fault analysis.

According to another aspect of the present invention, there is a system for maintaining core dump privacy during application fault handling, comprising: a processor and a memory configured to provide computer program instructions to the processor to execute the function of the component; a core memory dump receiving component for receiving a core memory dump for an application from a runtime engine; a structural data identifying component for analyzing areas of the core memory dump to identify structural data in the form of internal structures of the runtime engine and retaining the identified structural data in a modified core memory dump; a data processing component for processing the remaining non-structural data in the areas of the core memory dump to ensure it is not readable by unauthorized entities in the modified core memory dump; and a resultant memory core dump providing component for outputting the modified core memory dump for fault analysis.

According to a further aspect of the present invention, there is provided a computer program product for maintaining core dump privacy during application fault handling, the computer program product comprising a computer readable storage medium having program instructions embodied therewith, the program instructions executable by a processor to cause the processor to: receive a core memory dump for an application from a runtime engine; analyze areas of the core memory dump to identify structural data in the form of internal structures of the runtime engine; retain the identified structural data in a modified core memory dump; process the remaining non-structural data in the areas of the core memory dump to ensure it is not readable by unauthorized entities in the modified core memory dump; and output the modified core memory dump for fault analysis.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A computer-implemented method of maintaining core dump privacy during application fault handling, comprising:
   receiving, by at least one processor executing within a computing environment, a core memory dump for an application from a runtime engine;
   analyzing areas of the core memory dump, wherein the areas comprise an object heap, using one or more definitions of runtime structures, the one or more definitions of runtime structures including relationships between runtime structures, to identify structural data of the core memory dump in a form of runtime internal structures of the runtime engine, the structural data excluding confidential runtime application data, and wherein the analyzing areas of the core memory dump comprises:
      generating a map of the areas being analyzed in the core memory dump, wherein generating the map comprises:
         searching contents, including data structure descriptions, of the core memory dump to locate an identifier, wherein the identifier indicates an area to be mapped, and wherein the area to be mapped is part of the areas being analyzed in the core memory dump; and
         mapping the area to be mapped by relating, using references between data structures within the area to be mapped, one data structure being mapped to another data structure being mapped, wherein the mapping facilitates overlaying the map onto the core memory dump to identify the structural data;
      overlaying the map of the areas being analyzed onto the core memory dump to identify the structural data to be retained;
   retaining, in a modified core memory dump, the structural data to be retained, wherein the structural data to be retained are internal structures of the runtime engine that are dynamically determined during execution of the application, and wherein data of the core memory dump not identified as the structural data to be retained are identified as non-structural data;
   determining that a portion of the non-structural data is non-confidential and another portion of the non-structural data, remaining non-structural data, is confidential;
   keeping the non-structural data that is not confidential, the remaining non-structural data being removed or hidden;
   including the remaining non-structural data with the structural data to be retained;
   processing the remaining non-structural data in the areas of the core memory dump to ensure it is not readable by unauthorized entities with access to the modified core memory dump, the remaining non-structural data being data not identified as the structural data to be retained and including the confidential runtime application data, and wherein the processing the remaining non-structural data removes the remaining non-structural data from the core memory dump to result in the modified core memory dump or hides the remaining non-structural data by obfuscating or encrypting the remaining non-structural data; and outputting the modified core memory dump for fault analysis to be used to resolve a failure relating to the application executing within the computing environment, the modified core memory dump including readable structural information related to an operation of runtime.

2. The computer-implemented method as claimed in claim 1, further comprising processing the remaining non-structural data in a manner that enables an authorized user to read the remaining non-structural data.

3. The computer-implemented method as claimed in claim 1, wherein the analyzing areas of the core memory dump comprises analyzing one or more of the following selected from a group consisting of: thread stacks, input/output buffers, and thread registers of the core memory dump.

4. The computer-implemented method as claimed in claim 1, wherein the outputting the modified core memory dump for fault analysis transmits the modified core memory dump to a remote external analysis system.

5. The computer-implemented method as claimed in claim 1, wherein the analyzing areas of the core memory dump comprises analyzing thread stacks.

6. The computer-implemented method as claimed in claim 1, wherein the analyzing areas of the core memory dump to identify structural data in the form of internal structures of the runtime engine is carried out by an analysis tool for inspection of the core memory dump.

7. A computer program product for maintaining core dump privacy during application fault handling, comprising:

a computer readable storage medium readable by a processing circuit and storing instructions for execution by the processing circuit for performing a method comprising:

receiving, by at least one processor executing within a computing environment, a core memory dump for an application from a runtime engine;

analyzing areas of the core memory dump, wherein the areas comprise an object heap, using one or more definitions of runtime structures, the one or more definitions of runtime structures including relationships between runtime structures, to identify structural data of the core memory dump in a form of runtime internal structures of the runtime engine, the structural data excluding confidential runtime application data, and wherein the analyzing areas of the core memory dump comprises:

generating a map of the areas being analyzed in the core memory dump, wherein generating the map comprises:

searching contents, including data structure descriptions, of the core memory dump to locate an identifier, wherein the identifier indicates an area to be mapped, and wherein the area to be mapped is part of the areas being analyzed in the core memory dump; and mapping the area to be mapped by relating, using references between data structures within the area to be mapped, one data structure being mapped to another data structure being mapped, wherein the mapping facilitates overlaying the map onto the core memory dump to identify the structural data;

overlaying the map of the areas being analyzed onto the core memory dump to identify the structural data to be retained;

retaining, in a modified core memory dump, the structural data to be retained, wherein the structural data to be retained are internal structures of the runtime engine that are dynamically determined during execution of the application, and wherein data of the core memory dump not identified as the structural data to be retained are identified as non-structural data;

determining that a portion of the non-structural data is non-confidential and another portion of the non-structural data, remaining non-structural data, is confidential;

keeping the non-structural data that is not confidential, the remaining non-structural data being removed or hidden;

including the remaining non-structural data with the structural data to be retained;

processing the remaining non-structural data in the areas of the core memory dump to ensure it is not readable by unauthorized entities with access to the modified core memory dump, the remaining non-structural data being data not identified as the structural data to be retained and including the confidential runtime application data, and wherein the processing the remaining non-structural data removes the remaining non-structural data from the core memory dump to result in the modified core memory dump or hides the remaining non-structural data by obfuscating or encrypting the remaining non-structural data; and outputting the modified core memory dump for fault analysis to be used to resolve a failure relating to the application executing within the computing environment, the modified core memory dump including readable structural information related to an operation of runtime.

8. The computer program product as claimed in claim 7, wherein the analyzing areas of the core memory dump comprises analyzing one or more of the following selected from a group consisting of: thread stacks, input/output buffers, and thread registers of the core memory dump.

9. The computer program product as claimed in claim 7, wherein the outputting the modified core memory dump for fault analysis transmits the modified core memory dump to a remote external analysis system.

10. The computer program product as claimed in claim 7, wherein the analyzing areas of the core memory dump comprises analyzing thread stacks.

11. The computer program product as claimed in claim 7, wherein the method further comprises processing the remaining non-structural data in a manner that enables an authorized user to read the remaining non-structural data.

12. The computer program product as claimed in claim 7, wherein the analyzing areas of the core memory dump to identify structural data in the form of internal structures of the runtime engine is carried out by an analysis tool for inspection of the core memory dump.

13. A computer system for maintaining core dump privacy during application fault handling, comprising:

a memory; and a processor in communication with the memory, wherein the computer system is configured to perform a method, said method comprising:

receiving, by at least one processor executing within a computing environment, a core memory dump for an application from a runtime engine;

analyzing areas of the core memory dump, wherein the areas comprise an object heap, using one or more definitions of runtime structures, the one or more definitions of runtime structures including relationships between runtime structures, to identify structural data of the core memory dump in a form of runtime internal structures of the runtime engine, the structural data excluding confidential runtime application data, and wherein the analyzing areas of the core memory dump comprises:

generating a map of the areas being analyzed in the core memory dump, wherein generating the map comprises:

searching contents, including data structure descriptions, of the core memory dump to locate an identifier, wherein the identifier indicates an area to be mapped, and wherein the area to be mapped is part of the areas being analyzed in the core memory dump; and mapping the area to be mapped by relating, using references between data structures within the area to be mapped, one data structure being mapped to another data structure being mapped, wherein the mapping facilitates overlaying the map onto the core memory dump to identify the structural data;

overlaying the map of the areas being analyzed onto the core memory dump to identify the structural data to be retained:

retaining, in a modified core memory dump, the structural data to be retained, wherein the structural data to be retained are internal structures of the runtime engine that are dynamically determined during execution of the application, and wherein data of the core memory dump not identified as the structural data to be retained are identified as non-structural data;

determining that a portion of the non-structural data is non-confidential and another portion of the non-structural data, remaining non-structural data, is confidential;

keeping the non-structural data that is not confidential, the remaining non-structural data being removed or hidden;

including the remaining non-structural data with the structural data to be retained;

processing the remaining non-structural data in the areas of the core memory dump to ensure it is not readable by unauthorized entities with access to the modified core memory dump, the remaining non-structural data being data not identified as the structural data to be retained and including the confidential runtime application data, and wherein the processing the remaining non-structural data removes the remaining non-structural data from the core memory dump to result in the modified core memory dump or hides the remaining non-structural data by obfuscating or encrypting the remaining non-structural data; and outputting the modified core memory dump for fault analysis to be used to resolve a failure relating to the application executing within the computing environment, the modified core memory dump including readable structural information related to an operation of runtime.

14. The computer system as claimed in claim 13, wherein the analyzing areas of the core memory dump comprises analyzing one or more of the following selected from a group consisting of: thread stacks, input/output buffers, and thread registers of the core memory dump.

15. The computer system as claimed in claim 13, wherein the outputting the modified core memory dump for fault analysis transmits the modified core memory dump to a remote external analysis system.

16. The computer system as claimed in claim 13, wherein the analyzing areas of the core memory dump comprises analyzing thread stacks.

17. The computer system as claimed in claim 13, wherein the method further comprises processing the remaining non-structural data in a manner that enables an authorized user to read the remaining non-structural data.

* * * * *